(12) United States Patent
Prasad et al.

(10) Patent No.: US 6,924,054 B2
(45) Date of Patent: Aug. 2, 2005

(54) FUEL SUPPLY FOR A FUEL CELL

(75) Inventors: Ravi Prasad, Corvallis, OR (US); Qin Liu, Corvallis, OR (US); Loren E. Johnson, Corvallis, OR (US); Michael L. Bullock, San Diego, CA (US); Winthrop D. Childers, San Diego, CA (US); L. Chris Mann, Corvallis, OR (US); Joseph W. Tsang, Corvallis, OR (US)

(73) Assignee: Hewlett-Packard Development Company L.P., Houston, TX (US)

( * ) Notice: Subject to any disclaimer, the term of this patent is extended or adjusted under 35 U.S.C. 154(b) by 581 days.

(21) Appl. No.: 10/000,249

(22) Filed: Oct. 29, 2001

(65) Prior Publication Data

US 2003/0082427 A1 May 1, 2003

(51) Int. Cl.$^7$ ................................................ H01M 8/04
(52) U.S. Cl. .......................... 429/34; 429/19; 220/4.12; 220/723
(58) Field of Search .................... 429/19, 34; 220/4.12, 220/723

(56) References Cited

U.S. PATENT DOCUMENTS

| | | | | |
|---|---|---|---|---|
| 3,782,598 A | * | 1/1974 | Basa | ............................ 222/49 |
| 3,940,031 A | * | 2/1976 | Fishman | .................. 222/386.5 |
| 5,216,452 A | * | 6/1993 | Suzuki | .......................... 347/86 |
| 5,650,811 A | | 7/1997 | Seccombe et al. | |
| 5,778,679 A | * | 7/1998 | Celorier et al. | ............... 62/47.1 |
| 5,903,292 A | | 5/1999 | Scheffelin et al. | |
| 5,956,057 A | | 9/1999 | Childers et al. | |
| 5,966,155 A | | 10/1999 | Pawlowski, Jr. et al. | |
| 6,116,723 A | | 9/2000 | Childers | |
| 6,260,544 B1 | * | 7/2001 | Spry et al. | ............... 220/723 X |
| 6,360,729 B1 | * | 3/2002 | Ellsworth | ................ 220/723 X |
| 6,558,825 B1 | * | 5/2003 | Faris et al. | ................ 429/19 X |
| 2003/0009942 A1 | | 1/2003 | Amendola et al. | |
| 2003/0037487 A1 | | 2/2003 | Amendola et al. | |
| 2004/0023087 A1 | * | 2/2004 | Redmond | ..................... 429/19 |

FOREIGN PATENT DOCUMENTS

WO        WO 03/006150        1/2003

* cited by examiner

*Primary Examiner*—Stephen J. Kalafut
(74) *Attorney, Agent, or Firm*—Walter W. Karnstein (57) ABSTRACT

The present invention concerns a fuel supply for a fuel cell. The fuel supply includes a fuel storage area configured to hold a fuel solution, a fuel solution outlet configured to pass the fuel solution from the fuel storage area, a waste storage area, a waste inlet configured to pass waste into the waste storage area, and a movable barrier separating the fuel storage area and the waste storage area. The movable barrier is configured to move as fuel solution is passed from the fuel storage area and waste solution is passed into the waste storage area to simultaneously decrease the volume of the fuel storage area and increase the volume of the waste storage area.

49 Claims, 4 Drawing Sheets

FUEL SUPPLY FOR A FUEL CELL

TECHNICAL FIELD

The present invention relates to a fuel supply for a fuel cell. More particularly, the invention concerns a fuel supply having a fuel storage area and a waste storage area separated by a movable barrier.

BACKGROUND OF THE INVENTION

Fuel cells in general, and hydrogen fuel cells in particular, have received increased interest as possible power supplies for portable electronic devices. A fuel cell is an electrochemical device for continuously converting chemicals into direct-current electricity. A fuel cell typically includes two electrically conducting electrodes separated by an ionic-conducting electrolyte, and also any necessary systems for moving fuel into the cell or waste out of the cell. Fuel is continuously fed to one of the electrodes, where it is converted to an intermediate and travels through the electrolyte. A chemical that reacts with the fuel intermediate is fed to the other electrode. In a hydrogen fuel cell, hydrogen is fed to the anode, and oxygen is fed to the cathode. At the anode, the hydrogen is oxidized to $H^+$ ions, which travel through the ionic-conducting electrolyte to the cathode. Electrons from the oxidation reaction travel through an external circuit to the cathode, thus powering a device connected to the fuel cell. At the cathode, the electrons reduce the oxygen, which then reacts with the hydrogen ions to form water as a waste product.

Fuel cells in general, and hydrogen fuel cells in particular, offer several advantages over the use of traditional batteries for portable electronic devices. For example, unlike batteries, a fuel cell produces electricity from fuels that are fed to the fuel cell only as needed. Therefore, the life of the fuel cell is theoretically unlimited, requiring only that the fuel supply be periodically replenished. Also, because hydrogen fuel cells produce water as a waste product, the use of fuel cells presents fewer environmental concerns than batteries, which generally contain hazardous chemicals such as heavy metals or acids.

While fuel cells may offer advantages over batteries for use with portable electronics, they may also present some problems. For example, the waste produced during operation of a hydrogen fuel cell must be disposed of or stored to prevent it from contaminating the electronic device or wetting a user. Also, the fuel supply should hold enough fuel to power the electronic device for an amount of time comparable to that possible with batteries. Finally, some fuel supplies may be unsuitably dangerous or expensive to use with a portable device. For example, compressed hydrogen gas may be explosive, and thus may present a danger to a user. Likewise, hydrogen liquid may be extremely expensive to produce and store, as it requires extremely low temperatures and special cryogenic storage containers.

SUMMARY OF THE INVENTION

The present invention concerns a fuel supply for a fuel cell. The fuel supply includes a fuel storage area, a fuel solution outlet configured to pass fuel from the fuel storage area, a waste storage area, a waste inlet configured to pass waste into the waste storage area, and a movable barrier separating the fuel storage area and the waste storage area. The movable barrier is configured to move as fuel is passed from the fuel storage area and waste is passed into the waste storage area to simultaneously decrease the volume of the fuel storage area and increase the volume of the waste storage area.

DETAILED DESCRIPTION OF THE PREFERRED EMBODIMENTS

Figure 1:
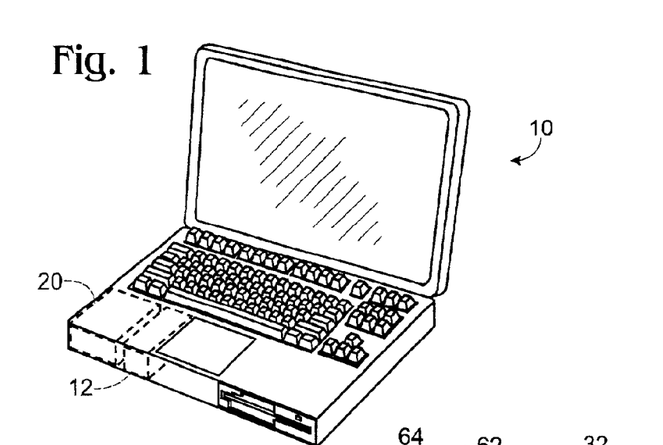
FIG. 1 is an isometric view of a portable computer, with a schematic depiction of a fuel supply according to one embodiment of the present invention shown in dashed lines.

The present invention provides a fuel supply configured to be removably coupled to a fuel cell to power a portable electronic device. An example device is shown generally at 10 in FIG. 1 as a laptop computer. An example placement of a fuel cell in the device is shown schematically at 12, and an exemplary embodiment and placement of a fuel supply is shown schematically at 20. The electronic device will typically include a receptacle, described in more detail below, configured to allow a user to easily insert or remove fuel supply 20. While the depicted fuel supply is shown in the context of a laptop computer, it will be appreciated that a fuel supply according to the present invention may be used in connection with a wide range of devices, such as personal digital assistants, palm devices, portable televisions, portable radios, portable compact disc, MP3 or cassette players, portable medical devices or instruments, etc. Also, while fuel cell 12 is shown positioned next to fuel supply 20 in electronic device 10, it will be appreciated that the fuel cell may be positioned in any other desired relation to the fuel supply.

Figure 2:
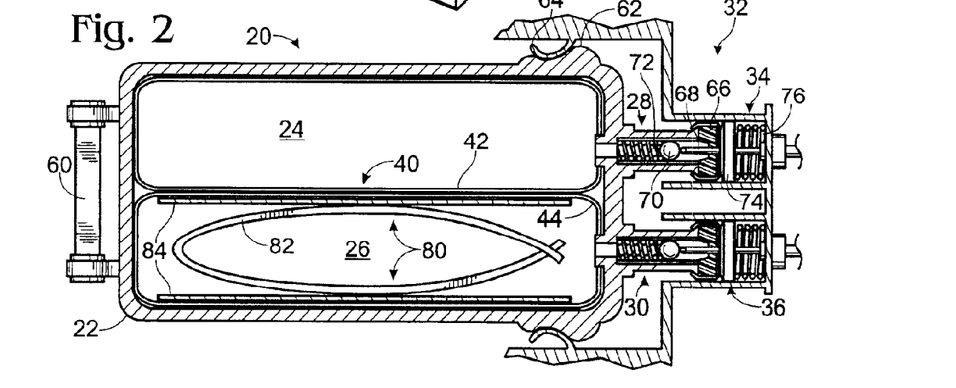
FIG. 2 is a sectional view of a first embodiment of a fuel supply according to the present invention.
Figure 3:
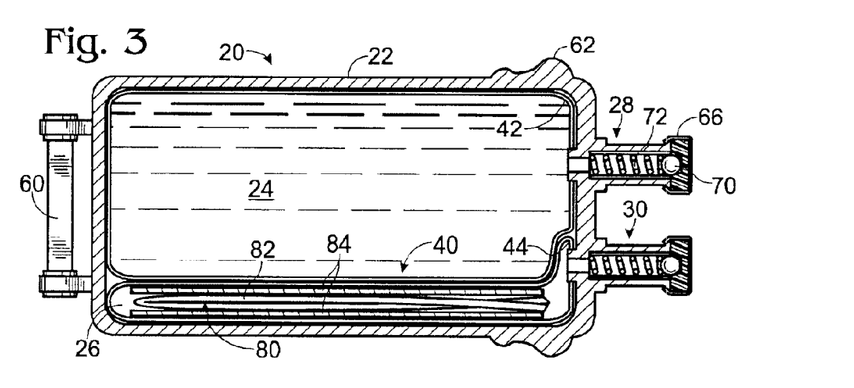
FIG. 3 is a sectional view of the fuel supply of FIG. 2, with a full fuel storage area and an empty waste storage area.
Figure 4:
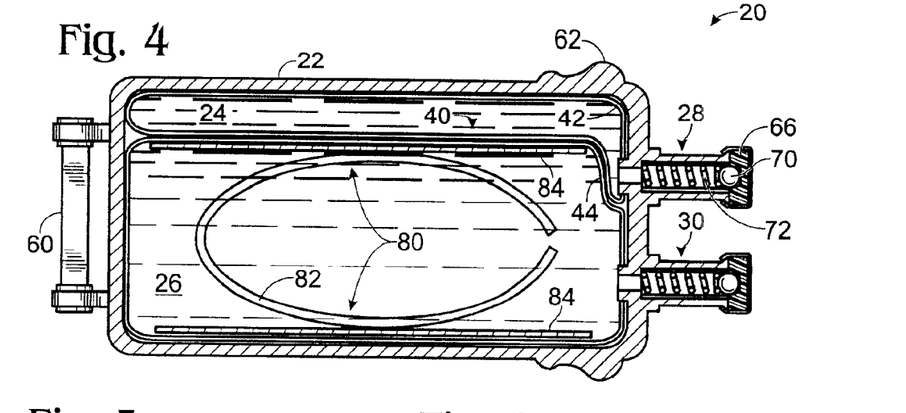
FIG. 4 is a sectional view of the fuel supply of FIG. 2, with an emptied fuel storage area and a filled waste storage area.

FIGS. 2–4 show fuel supply 20 in more detail. Fuel supply 20 includes an outer container 22 that encloses a fuel storage area 24 for storing a fuel solution and a waste storage area 26 for storing a waste solution. Fuel solution is passed from fuel storage area 24 to the fuel cell through a fuel solution outlet 28, and waste is passed into waste storage area 26 through a waste inlet 30.

Fuel supply 20 is configured to fit within a receptacle disposed on the electronic device to interface with fuel cell 12. This receptacle, shown generally at 32 in FIG. 2, is described in more detail below. While fuel supply 20 of the depicted embodiment is configured to mount directly to an electronic device to fuel an on-board fuel cell, it will be appreciated that the fuel supply may also be configured to supply fuel to an off-device fuel cell as well.

Initially, before any fuel solution has been removed from fuel supply 20, fuel storage area 24 takes up nearly the entire interior volume of outer container 22, as shown in FIG. 3. Use of the fuel cell, however, reduces the volume of fuel contained within fuel supply 20, and also produces a waste. For example, a sodium borohydride solution (or other borohydride solution) may be used as a hydrogen source for a hydrogen fuel cell. This is advantageous compared to liquid or gaseous hydrogen, as the borohydride solution is neither explosive nor expensive to produce or store. Hydrogen is produced by reacting the borohydride solution with water in the presence of a catalyst and/or heat, as represented by the following equation:

$$NaBH_4(aq) + 2H_2O \rightarrow NaBO_2(aq) + 4H_2 \quad (1)$$

This reaction, generally carried out with a great excess of water, produces an aqueous solution of $NaBO_2$ as a waste product. Furthermore, operation of the hydrogen fuel cell produces water as a waste product at the cathode. Either, or both, of these waste solutions may be fed into waste storage area 26. In this situation, the volume of fuel in fuel storage area 24 continually decreases, while the volume of waste in waste storage area 26 continually increases, during continued operation of the fuel cell. To take advantage of the fact that the relative volumes of fuel storage area 24 and waste storage area 26 vary inversely over the lifetime of the fuel supply (i.e. the volume of waste storage area 26 increases as the volume of fuel storage area 24 decreases), outer container 20 may be configured to be large enough to hold either a full volume of fuel solution or waste solution, but not full volumes of fuel solution and waste solution simultaneously. This allows for a decreased size of fuel supply 20 relative to a fuel supply that could hold full volumes of fuel and waste simultaneously, or compared to the use of separate containers for fuel and waste solutions. In the most efficient case, this reduces the required internal volume of the fuel cartridge by fifty percent, or increases the total energy content for a given volume by 100 percent. However, the actual gain in total energy content may vary depending upon the actual fuel cell type and operational factors.

While the exemplary embodiments herein are described in the context of a hydrogen fuel cell, it will be appreciated that they may be used with any other desired type of fuel cell, such as a direct methanol fuel cell or a solid oxide fuel cell. Furthermore, although the fuel supply is described herein in the context of holding a borohydride fuel solution, it will be appreciated that a fuel supply according to the present invention may be used with any other suitable fuel solution, including, but not limited to, a methanol solution, an ethanol solution, mixtures of these or other alcohols, or liquid hydrocarbons such as gasoline pentane, kerosene or diesel.

A movable barrier or divider, indicated generally at 40 in FIGS. 2–4, separates fuel storage area 24 and waste storage area 26. Movable barrier 40 is configured to move as fuel is removed from fuel solution outlet 28, simultaneously reducing the volume of fuel storage area 24 and increasing the volume of waste storage area 26. This permits the interior volume of outer container 22 to be used more efficiently than if fuel storage area 24 and waste storage area 26 were of fixed volume. The movement of movable barrier 40 allows the relative volumes of fuel storage area to vary inversely to accommodate these fluid volume changes. Thus, although waste storage area 26 occupies little volume initially, once fuel supply 20 has been essentially exhausted of fuel, waste storage area 26 will ideally occupy essentially the entire inner volume of outer container 22, as shown in FIG. 4. In some applications, however, the volumes of fuel storage area 24 and waste storage area 26 may change at different volumes, which may result in either the waste volume being greater than the expended fuel volume, or the expended fuel volume being greater than the waste volume. To compensate for such differences, the maximum volumes of fuel storage area 24 and waste storage area 26 could be varied accordingly.

Any suitable design for barrier 40 may be used. Suitable barrier designs include those that prevent the mixing of fuel solution and waste products yet permit the volumes of fuel storage area 24 and waste storage area 26 to vary inversely. In the embodiment depicted in FIGS. 2–4, barrier 40 includes a first flexible inner container 42 surrounding fuel storage area 24, and a second flexible inner container 44 surrounding waste storage area 26. First flexible inner container 42 is in fluid communication with fuel solution outlet 28, and second flexible inner container 44 is in fluid communication with waste inlet 30. Each of first flexible inner container 42 and second flexible inner container 44 has a large enough maximum volume to fill essentially the entire inner volume of outer container 22, yet may be collapsed to take up very little volume within the outer container. This allows the combined volumes of first flexible inner container 42 and second flexible inner container 44 to occupy essentially all of the inner volume of outer container 22 over the entire lifetime of fuel supply 20.

First flexible inner container 42 and second flexible inner container 44 may be made of any suitable material. Suitable materials include those that are non-brittle, impermeable and chemically stable to the fuel and waste solutions. Suitable materials also include those that provide a high gas barrier to prevent the contamination of the fuel solution with oxygen or other atmospheric gasses (which may cause premature oxidation of the borohydride). Examples of suitable materials for first and second flexible inner containers 42 and 44 include polyolefins, such as polypropylene, polyethylene (typically high density polyethylene), polyetheretherketone (PEEK), polystyrene blends or copolymers, polysulfone, and polymer blends and copolymers of these materials. These materials may be crosslinked to increase the chemical resistance of flexible inner containers 42 and 44 to the fuel and waste solutions, respectively.

Figure 5:
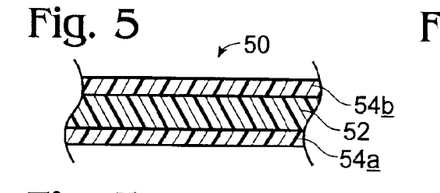
FIG. 5 is a schematic depiction of one construction of the barrier dividing the fuel storage area and the waste storage area of the fuel supply of FIG. 2.
Figure 6:
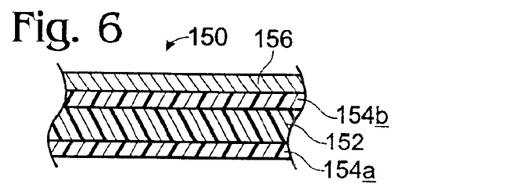
FIG. 6 is a schematic depiction of an alternate construction of the barrier dividing the fuel storage area and the waste storage area of the fuel supply of FIG. 2.

First flexible inner container 42 and second flexible inner container 44 may also be made from a composite or multi-layered structure, rather than from a single-layered structure. FIGS. 5 and 6 show schematic depictions of two suitable multi-layered constructions for first flexible inner container 42 and second flexible inner container 44. First, FIG. 5 shows generally at 50 a three-layer structure composed of a middle, high-gas barrier layer 52 sandwiched between two chemically inert outer layers 54a and 54b. Each of these layers may be made of any suitable materials. For example, middle layer 52 may be constructed of a liquid crystal polymer or a polyamide, which has an extremely low permeability to gasses, and outer layers 54a and 54b may be constructed of a suitable polymer, such as polyethylene, polypropylene, polystyrene blends or copolymers, PEEK, polysulfone, and polymer blends and copolymers of these materials.

FIG. 6 shows generally at 150 a second suitable multi-layered structure from which first flexible inner container 42 and/or second flexible inner container 44 may be constructed. Like layered structure 50, layered structure 150 includes an inner layer 152 of low gas permeability, such as a liquid crystal polymer layer, sandwiched by two inert layers 154a and 154b (for example, polymer layers). However, structure 150 also includes a metallic outer layer 156. Metallic outer layer 156 provides an additional gas barrier layer, and also helps to improve heat transfer between waste storage area 26 and fuel storage area 24.

Yet a third suitable multi-layered structure (not shown) may be formed from a five-layer structure comprising an inner polymer layer sandwiched between two metallic layers. Each metallic layer, in turn, is covered by a bonding layer that allows the material to be bonded to itself to form a container. The polymer layer may be formed from any of the above-described polymer compounds suitable for use with materials 50 or 150, described above. Similarly, the bonding layer may be made from any suitable material that may be bonded to itself. An example of a suitable material is polyethylene.

Because a borohydride fuel solution may need to be heated during use (typically with electrical power from the fuel cell itself), and the waste solution may have an elevated temperature relative to the fuel solution as the waste solution enters the waste storage area. Having first flexible inner container 42 and second flexible inner container 44 next to each other is therefore advantageous, as transfer of residual heat from the waste solution to the fuel solution may help increase the temperature of the fuel solution before it leaves fuel storage area 24. This may reduce the amount of energy needed to heat the fuel solution for hydrogen production.

Referring again to FIG. 2, fuel supply 20 may include various other features to improve fuel supply performance. For example, outer container 22 may include a handle 60 to assist with the easy insertion or removal of fuel supply 20 from the electronic device. Handle 60 may be positioned on a trailing end relative to the direction in which fuel supply 20 is inserted into the receptacle to facilitate insertion. Furthermore, handle 60 may be pivotally mounted to outer container 22 (or otherwise foldably mounted) to allow handle 60 to be more compact and more easily grasped. Outer container 22 may also include one or more retention elements 62 configured to engage a retention device, such as a leaf spring 64, disposed within the interior of the fuel supply interface. Handle 60 and retention elements 62 may be molded or otherwise formed as a part of outer container 22, or may be attached as separate pieces to the outer container.

Outer container 22 may be constructed of any suitable material. The choice of material used for outer container 22 may depend to some degree on the environment that will surround outer container 22 in ordinary use. For example, in the embodiment depicted in FIGS. 2–4, both the fuel solution and the waste solution are contained within inner containers. Thus, outer container 22 does not need to be constructed of a material with any particular resistance to the fuel and waste solutions (though it may still be desirable to use chemically resistant materials, for example to contain a leak more effectively). It may also be desirable to construct outer container 22 of a relatively lightweight and inexpensive material to reduce the weight and cost of fuel supply 20. Examples of suitable materials from which outer container 22 may be constructed include polyethylene, polypropylene, polyethylene terephthalate, polystyrene blends and copolymers, PEEK, polysulfone, and polymer blends and copolymers of these materials. It will be appreciated that outer container 22 need not even be a container, but instead may be an open structure that merely defines a space for the fuel and waste storage areas.

Waste storage area 26 may include a super-absorbent material to prevent waste from leaking out of waste inlet 30, or from spilling if second flexible inner container 44 ruptures. A super-absorbent material is a material that is very thin when dry, but can expand to absorb a volume of a fluid many times greater than the initial volume of the material. Examples of super-absorbent materials that may be used in waste storage area 26 include cross-linked polyacrylic acid salts, polyvinyl alcohol, poly(2-hydroxyethyl methacrylate)/poly(ethylene oxide), isobutylene-maleic acid copolymer derivatives, poly(methacrylic acid) salts, poly(acrylamide) and polyvinylpyrrolidone. Furthermore, a super-absorbent material may be placed at any other desired location within outer container 22 to absorb either fuel solution or waste solution in the event of a rupture. Also, other absorbent materials besides superabsorbent materials may be used as well. Examples include cellulose sponge materials and standard foams.

Fuel solution outlet 28 and waste inlet 30 are configured to be coupled to complementary connectors 34 and 36 within receptacle 32 to connect fuel storage area 24 and waste storage area 26 to fuel cell 12. Any suitable connectors and valves may be used for fuel solution outlet 28 and waste inlet 30. Typically, self-sealing connectors, or connectors that are automatically sealed whenever fuel supply 20 is not in the receptacle, are used. In the embodiment depicted in FIGS. 2–4, each of the fuel solution outlet 28 and waste inlet 30 includes a redundant septum/ball-and-spring valve system. Each of the septum and the ball-and-spring valve are self-sealing. The use of a redundant sealing mechanism provides more security against leakage than the use of a single self-sealing system.

The septum of the redundant septum/ball-and-spring valve system is indicated at 66. Septum 66 includes a small opening configured to accept a hollow-tipped needle 68 and to seal when needle 68 is removed. Each needle 68 may be situated within receptacle 32 in such a manner as to automatically penetrate septum 66 when fuel supply 20 is inserted into the receptacle.

A ball 70 is positioned directly behind septum 66. Ball 70 is biased against the inside of septum 66 via a spring 72 when fuel supply 20 is not in use to prevent fuel or waste solution from reaching the septum. Insertion of fuel supply 20 into receptacle 32, however, causes needle 68 to penetrate septum 66 and push ball 70 away from the inside surface of septum 66 into a slightly wider part of fuel solution outlet 28. This allows fuel to flow past ball 70, into the hollow tip of needle 68, and thus into the fuel cell. A sealing plate 74 positioned on the receptacle side of the interface may be pushed against the top of septum 66 by a spring 76 contained within receptacle 32 to further strengthen the seal between fuel supply 20 and the receptacle. It will be appreciated that the redundant septum/ball-and-spring valve systems may also be positioned within receptacle 32 instead of on fuel supply 20, and that the needles may be positioned on fuel supply 20 instead of within receptacle 32, without departing from the scope of the present invention.

Fuel supply 20 may also include a pressurizer to increase the pressure within fuel storage area 24 slightly relative to the pressure outside of the fuel storage area. This helps to ensure reliable flow of fuel from the fuel storage area, regardless of any changes in atmospheric pressure. Any suitable mechanism may be used to pressurize fuel storage area 24. In the embodiment depicted in FIGS. 2–4, fuel supply 20 includes a pressurizer 80 in the form of a spring 82 that pushes against the outside of first flexible inner container 42 to compress the first flexible inner container. While the spring of the depicted embodiment is a bow spring, any other suitable type of spring may be used without departing from the scope of the present invention.

Spring 82 may be positioned at any suitable location within outer container 22. For example, spring 82 may be positioned between an inner wall of outer container 22 and first flexible inner container 42. In the depicted embodiment, however, spring 82 is positioned within the inside of second flexible inner container 44. This positioning of spring 82 causes both an increase in pressure within first flexible inner container 42, and a decrease in pressure within second flexible inner container 44. Decreasing the pressure within second flexible inner container 44 relative to the outside environment offers the additional advantage of helping to prevent waste from leaking out of waste storage area 26 by creating a backpressure across waste inlet 30.

Spring 82 may be configured to push directly against the interior walls of second flexible inner container 44 if desired. However, this may cause the walls of first and second flexible inner containers 42 and 44 to distort, and thus may cause the magnitude of the pressure in first flexible inner container 42 (and the backpressure in second flexible inner container 44) to vary over the lifetime of the fuel supply. Therefore, pressurizer 80 may also include a pressure distribution mechanism to distribute pressure from spring 82 more evenly across the interior walls of first and second flexible inner containers 42 and 44.

Any suitable pressure distribution mechanism may be used. For example, the interior walls of first flexible inner container 42 and second flexible inner container 44 may include stiffening members that prevent them from distorting. In the depicted embodiment, however, a generally rigid plate 84 is disposed between each location at which spring 82 pushes against the interior walls of second flexible inner container 44. Plates 84 may be attached to spring 82, to the interior walls of second flexible inner container 44, or may float freely between the spring and the walls of the second flexible inner container. Furthermore, plates 84 may be any suitable size. It may be desirable for plates 84 to have a relatively large size to distribute the pressure across the interior walls of second flexible inner container 44 evenly.

Operation of pressurizer 80 is demonstrated in FIGS. 3–4. Initially, when first flexible inner container 42 is full of fuel, spring 82 is in a compressed state, as shown in FIG. 3. As fuel is removed from first flexible inner container 42, spring 82 expands, increasing the volume of second flexible inner container 44 while decreasing the volume of the first flexible inner container. Thus, once fuel supply 20 is exhausted of fuel, spring 82 is in a more extended state relative to its initial state, as shown in FIG. 4.

In order to ensure proper operation of a fuel cell, fuel supply 20 must be inserted into receptacle 32 in the correct orientation. To prevent a user from inserting fuel supply 20 into receptacle 32 in the wrong orientation, fuel supply 20 may include keying features that line up with complementary keying features contained within interface 35 only when fuel supply 20 is in the correct orientation. The keying features may alternatively be described as aligning and/or guiding features. The keying features provide alignment of fuel solution outlet 28 with respect to connector 34. They also provide alignment of waste inlet 30 with respect to connector 36. Fuel solution outlet 28, waste inlet 30, and the keying features are typically disposed on a leading end of fuel supply 20 relative to a direction of installation of the supply into the receptacle. This positioning may lessen any misalignment variation of the fuel solution outlet with respect to the fuel solution inlet.

The keying features may also be employed to ensure that the wrong fuel supply is not installed into a particular receptacle. For example, for a system designed to accept fuel applicable to a solid oxide fuel cell, one would not want to install a fuel cartridge designed for a direct alcohol fuel cell. Similarly, the keying features may indicate a grade of fuel, or a safety aspect of the fuel. In general, different keying features may be used on different types of fuel supplies to distinguish the fuel supplies and to prevent the wrong type of fuel supply from being inserted into a fuel cell receptacle.

Figure 7:
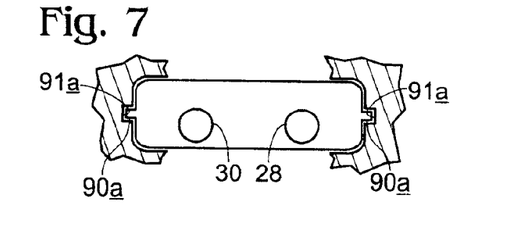
FIG. 7 is a somewhat simplified, front view of the fuel supply of FIG. 2, showing a first configuration of keying elements.
Figure 8:
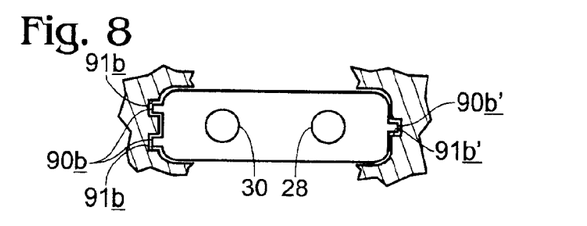
FIG. 8 is a somewhat simplified, front view of the fuel supply of FIG. 2, showing a second configuration of keying elements.
Figure 9:
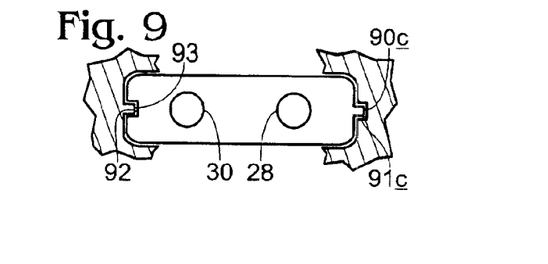
FIG. 9 is a somewhat simplified, front view of the fuel supply of FIG. 2, showing a third configuration of keying elements.

Any suitable keying features may be used. FIGS. 7–9 show examples of three possible configurations of keying features. First, in FIG. 7, outer container 22 includes a pair of wings 90a that fit into complementary connectors 91a in receptacle 22 to center fuel supply 20 in the receptacle 22. Furthermore, fuel solution outlet 28 and waste inlet 30 are offset relative to the horizontal center line of outer container 22, and thus have an asymmetry along at least one axis or plane of symmetry relative to the fuel solution outlet and waste inlet. Thus, if fuel supply 20 is inserted into receptacle 32 in the wrong orientation, fuel solution outlet 28 and waste inlet 30 will not line up correctly with complementary connectors 34 and 36, respectively, thus preventing the fuel supply from being fully inserted into receptacle 32.

FIG. 8 shows another possible configuration of keying elements. In FIG. 8, outer container 22 includes an asymmetric arrangement of wings. Two wings 90b are located on one side of outer container 22, and a single wing 90b' is located on the outer side of the outer container. Receptacle 32 will have complementary slots 91b to accept wings 90b, and a complementary slot 91b' to accept wing 90b'. Thus, if fuel supply 20 is inserted into receptacle 32 in the wrong orientation, wings 90b will not line up with slot 91b' in receptacle 32, and wing 90b' will not line up with either of slots 91b, thus preventing fuel supply 20 from being inserted.

FIG. 9 shows a third possible configuration of keying elements. In FIG. 9, outer container 22 includes a protruding wing 90c located on one side of outer container 22, and a recess 92 formed in the other side of the outer container. Wing 90c is configured to fit into a complementary recess 91c in receptacle 32, and recess 92 is configured to accommodate a complementary wing 93 disposed within receptacle 32. Thus, if fuel supply 20 is inserted into receptacle 32 in the wrong orientation, the misalignment of wing 90c and complementary wing 93 in receptacle 32 with their corresponding recesses will prevent fuel supply 20 from being inserted.

It will be appreciated that the keying features shown in FIGS. 7–9 are merely exemplary, and that any other suitable keying features may be used without departing from the scope of the present invention. Also, the keying features may be integrated with retention elements 62, if desired. Combining the keying features with retention elements 62 may allow the design of fuel supply 20 to be more compact.

Furthermore, while the keying features described above also perform guiding and aligning functions, the structures that perform the keying functions may be separated from those that perform the guiding and/or aligning functions, if desired.

Figure 10:
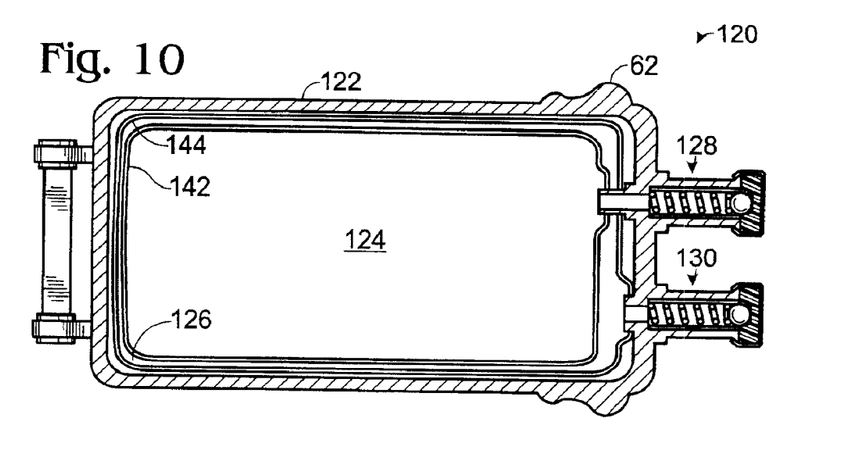
FIG. 10 is a sectional view of a second embodiment of a fuel supply according to the present invention, with a full fuel storage area and an empty waste storage area.
Figure 11:
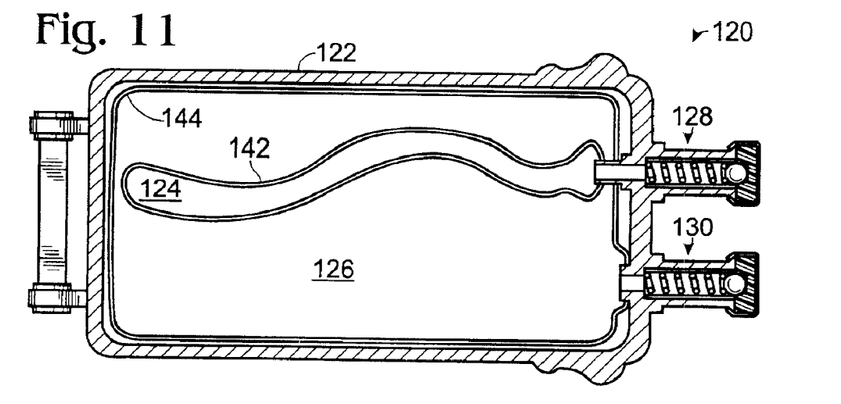
FIG. 11 is a sectional view of the fuel supply of FIG. 10, with an emptied fuel storage area and a filled waste storage area.

FIGS. 10–11 show generally at 120 a second embodiment of a fuel supply according to the present invention. Fuel supply 120 is similar to fuel supply 20 described above, and may include any or all of the features described for fuel supply 20. For example, fuel supply 120 includes an outer container 122, and a fuel storage area 124 and waste storage area 126 contained within outer container 122. Fuel storage area 124 is bounded by a first flexible inner container 142, and waste storage area 136 is bounded by a second flexible inner container 144. Fuel supply 120 also includes a fuel inlet 128 configured to pass fuel from fuel storage area 124 to a fuel cell, and a waste inlet 130 configured to accept waste from the fuel cell and/or the catalyst.

In the embodiment of FIGS. 10–11, however, first flexible inner container 142 is positioned within the interior of second flexible inner container 144, rather than in a side-by-side arrangement. Thus, as waste flows into waste storage area 126, the waste fills second flexible inner container 144 and exerts pressure on the walls of first flexible inner container 142 from a plurality of directions. This causes the pressure within fuel storage area 124 to be increased slightly relative to the outside environment, which helps to ensure that fuel flows out of the fuel storage area as required.

Positioning first flexible inner container 142 within the interior of second flexible inner container 144 offers other advantages as well. For example, in this configuration, heat from the waste solution may be transferred more quickly and efficiently to the fuel solution. This is because, first, only one layer of container material separates the fuel solution from the waste solution, and, second, more surface area of first flexible inner container 142 is exposed to heat from the waste solution. While fuel storage area 124 of the depicted embodiment is described as being contained within first flexible container 142 and surrounded by waste storage area 126, it will be appreciated that the fuel storage area may instead surround the waste storage area without departing from the scope of the present invention.

Figure 12:
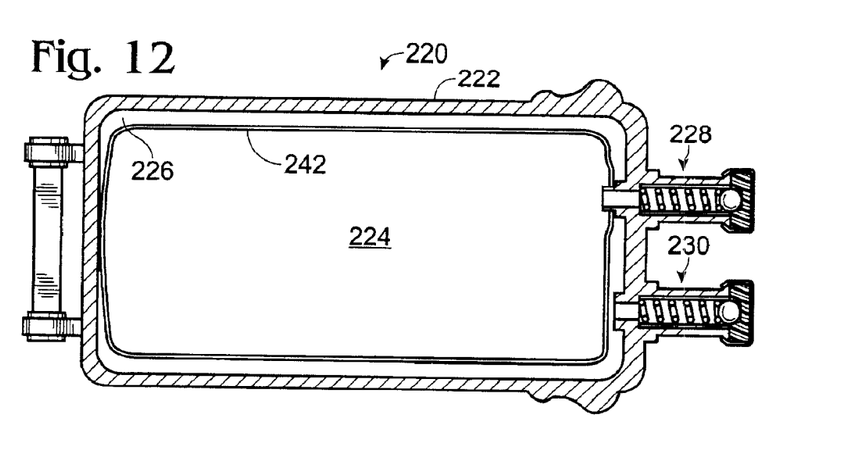
FIG. 12 is a sectional view of a third embodiment of a fuel supply according to the present invention, with a filled fuel storage area and an empty waste storage area.

FIG. 12 shows generally at 220 a third embodiment of a fuel supply according to the present invention. Fuel supply 220 includes an outer container 222 enclosing a fuel storage area 224 and a waste storage area 226, a fuel solution outlet 228 configured to pass fuel out of the fuel storage area, and a waste inlet 230 configured to pass waste into the waste storage area. Furthermore, fuel supply 220 includes a flexible inner container 242 that bounds fuel supply area 224. However, in the embodiment of FIG. 12, waste storage area 226 is not enclosed by a separate flexible inner container. Instead, the outer boundary of waste storage area 226 is defined by the inner wall of outer container 222. In this embodiment, fuel storage area 224 is completely surrounded by waste storage area 226, allowing for the efficient transfer of heat from the waste solution to the fuel solution. Furthermore, the waste solution will exert pressure on flexible inner container 242, thus pressurizing fuel storage area 224 relative to atmospheric pressure, helping to ensure reliable flow of fuel solution from the fuel storage area.

Figure 13:
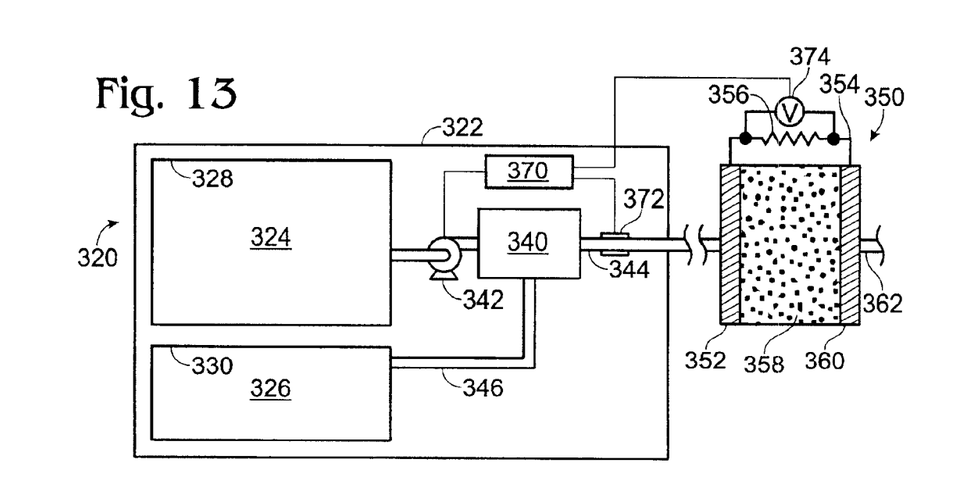
FIG. 13 is a schematic depiction of a fourth embodiment of a fuel supply according to the present invention.

A fuel supply according to the present invention may also be configured to supply hydrogen gas to a fuel cell, rather than a fuel solution. FIG. 13 shows generally at 320 a schematic depiction of fourth embodiment of a fuel supply according to the present invention. As with the previously described embodiments, fuel supply 320 includes an outer container 322 enclosing a fuel storage area 324 and a waste storage area 326. Furthermore, fuel storage area 324 is bounded by a first inner container 328, and waste storage area 326 is bounded by a second inner container 330.

Unlike the previously described embodiments, however, fuel supply 320 also includes a catalyst 340 to produce hydrogen gas from the fuel solution. Fuel solution from fuel storage area 324 is fed to a catalyst 340 via a pump 342. Catalyst 340 catalyzes the conversion of the borohydride in the fuel solution to hydrogen gas and borate waste in the presence of water (or other suitable oxygen source). Any suitable catalyst may be used to catalyze the production of hydrogen from the borohydride. Examples include platinum, ruthenium and other metals.

Similarly, any suitable pump may be used to transfer fuel solution from fuel storage area 324 to catalyst 340. Examples include diaphragm pumps, diastolic pumps and cam-operated positive displacement pumps. Pump 342 will typically be placed between fuel storage area 324 and catalyst 340, but may also be positioned in any other suitable location within fuel supply 320 without departing from the scope of the present invention.

Hydrogen produced by catalyst 340 is fed to a fuel cell 350 via a hydrogen supply line 344, and aqueous borate waste produced at catalyst 340 is fed to waste storage area 326 via a waste return line 346. The hydrogen is fed to the fuel cell anode 352, where it is oxidized to $H^+$ ions. The electrons produced in the oxidation reaction travel through an external circuit 354 to power a device, represented by resistor 356. The hydrogen ions travel through the electrolyte 358 to the cathode 360. At cathode 360, the electrons reduce molecular oxygen, which combines with the hydrogen ions to form water as a waste product. The water is transported from the cathode via a fuel cell waste line 362. Fuel cell waste line 362 may either feed the waste into waste storage area 326 of fuel supply 320, into another waste receptacle, or to the external environment.

The power needs of the device powered by the fuel cell may vary during usage. Thus, fuel supply 320 may include a feedback mechanism to monitor the fuel consumption of fuel cell 350 and adjust the flow of fuel solution to catalyst 340 accordingly. Any suitable feedback mechanism may be used. In the depicted embodiment, fuel supply 320 includes a controller 370 with an output line connected to pump 342. Controller 370 receives input from one or more sensors that monitor the performance of fuel cell 350, and adjusts the rate of transfer of fuel solution to catalyst 340 in response to the input. In the depicted embodiment, controller 370 receives input from a pressure sensor 372 that monitors hydrogen gas pressure in hydrogen supply line 344, and from a voltage sensor 374 that measures the fuel cell output voltage. When a drop is detected in either the hydrogen supply line pressure or the cell output voltage to a level below a predetermined level, controller 370 signals pump 342 to transfer more fuel solution to catalyst 340 to increase the rate of flow of hydrogen to fuel cell 350. Again, it will be appreciated that, although fuel supply 320 is described in the context of a hydrogen fuel cell, the feedback mechanism may be used with any other desired fuel cell, including solid oxide or direct methanol fuel cells.

Figure 14:
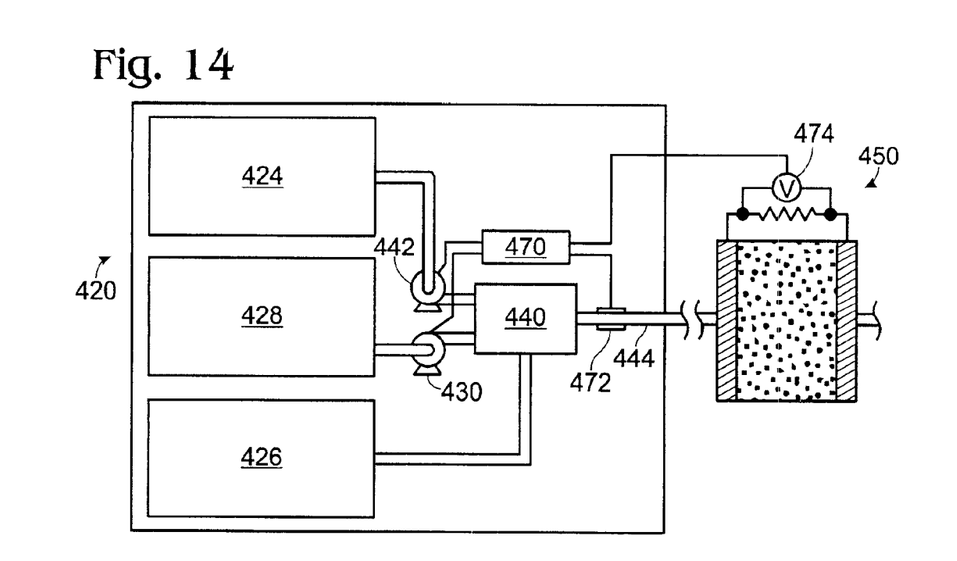
FIG. 14 is a schematic depiction of a fifth embodiment of a fuel supply according to the present invention.

FIG. 14 shows generally at 420 a fifth embodiment of a fuel supply according to the present invention. Like fuel supply 320 of FIG. 13, fuel supply 420 includes a fuel storage area 424 and a waste storage area 426. Fuel supply 420 also includes a hydrogen production system that includes a catalyst 440, a pump 442 for transporting fuel solution from the fuel storage area 424 to the catalyst, and a hydrogen supply line 444 that outputs hydrogen gas to a fuel cell 450. Unlike fuel supply 320, however, fuel supply 420 includes an additional reactant storage area 428. Reactant storage area 428 is configured to hold a reactant with which the borohydride reacts to form hydrogen gas, such as water or an aqueous alkaline solution, and to feed reactant to catalyst 440 as needed. This allows the fuel solution stored in fuel storage area 424 to be mixed with a lesser quantity of solvent than would be possible in the absence of a separate reactant storage area 428, which may reduce the amount of borohydride that reacts with the solvent during storage.

Reactant is transferred from reactant storage area 428 to catalyst 440 via a second pump 430. Fuel supply 420 also includes a controller 470 that receives input from a gas pressure sensor 472 that measures hydrogen gas pressure upstream of the fuel cell and/or a voltage sensor 474 that measures the output voltage of the fuel cell with a voltage sensor 374. Controller 470 is configured to trigger pumps 430 and 442 to pump reactant solution and fuel solution, respectively, to catalyst 440 when either the hydrogen pressure or the fuel cell output voltage drops below a predetermined level so as to increase the rate of flow of hydrogen to fuel cell 450.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

We claim:

1. A fuel supply for a fuel cell, the fuel cell having an anode and a cathode, the fuel supply comprising:
    a fuel storage area, the fuel storage area having a volume;
    a fuel solution outlet configured to pass a fuel solution from the fuel storage area;
    a waste storage area, the waste storage area having a volume;
    a waste inlet configured to pass waste into the waste storage area; and
    a movable barrier separating the fuel storage area and the waste storage area, wherein the movable barrier is a first flexible bag that surrounds the fuel storage area, and wherein the movable barrier is configured to move as the fuel solution is passed from the fuel storage area and a waste is passed into the waste storage area to simultaneously decrease the volume of the fuel storage area and increase the volume of the waste storage area; and
    a second flexible bag surrounding the waste storage area.

2. The fuel supply of claim 1, wherein the first flexible bag is disposed within the second flexible bag such that expansion of the volume of the waste storage area compresses the fuel storage area from a plurality of directions.

3. The fuel supply of claim 1, wherein the first flexible bag and the second flexible bag are disposed in a side-by-side arrangement.

4. A fuel supply for a fuel cell, the fuel cell having an anode and a cathode, the fuel supply comprising:
    a fuel storage area, the fuel storage area having a volume;
    a fuel solution outlet configured to pass a fuel solution from the fuel storage area;
    a waste storage area, the waste storage area having a volume;
    a waste inlet configured to pass waste into the waste storage area; and
    a movable barrier separating the fuel storage area and the waste storage area, wherein the movable barrier is configured to move as the fuel solution is passed from the fuel storage area and a waste is passed into the waste storage area to simultaneously decrease the volume of the fuel storage area and increase the volume of the waste storage area, and wherein the movable barrier includes a metal layer for facilitating heat exchange between the waste storage area and the fuel storage area.

5. A fuel supply for a fuel cell, the fuel cell having an anode and a cathode, the fuel supply comprising:
    a fuel storage area, the fuel storage area having a volume;
    a fuel solution outlet configured to pass a fuel solution from the fuel storage area;
    a waste storage area, the waste storage area having a volume;
    a waste inlet configured to pass waste into the waste storage area; and
    a movable barrier separating the fuel storage area and the waste storage area, wherein the movable barrier is configured to move as the fuel solution is passed from the fuel storage area and a waste is passed into the waste storage area to simultaneously decrease the volume of the fuel storage area and increase the volume of the waste storage area, and wherein the movable barrier is a flexible bag with a multi-layer construction, the multi-layer construction including an inner gas barrier layer disposed between layers resistant to the fuel solution.

6. The fuel supply of claim 5, wherein the inner gas barrier layer includes a liquid crystal polymer sheet.

7. The fuel supply of claim 5, wherein the fuel cell is a hydrogen fuel cell.

8. The fuel supply of claim 7, wherein the fuel solution is a borohydride solution.

9. The fuel supply of claim 8, wherein the waste includes borate waste product.

10. The fuel supply of claim 7, wherein the waste includes water produced at the cathode.

11. The fuel supply of claim 5, wherein the fuel cell is a direct methanol fuel cell.

12. The fuel supply of claim 5, wherein the fuel cell is a solid oxide fuel cell.

13. The fuel supply of claim 5, wherein the fuel solution includes an alcohol.

14. The fuel supply of claim 13, wherein the alcohol is selected from the group consisting of ethanol and methanol.

15. The fuel supply of claim 5, wherein the fuel includes a liquid hydrocarbon.

16. The fuel supply of claim 15, wherein the liquid hydrocarbon is selected from the group consisting of gasoline, pentane, kerosene and diesel.

17. The fuel supply of claim 5, further comprising a pressurizer configured to apply a positive pressure to the movable barrier to direct the fuel solution to flow out of the fuel storage area.

18. The fuel supply of claim 17, wherein the pressurizer is a spring configured to push against the movable barrier.

19. The fuel supply of claim 5, wherein the fuel supply is configured to be coupled with an electronic device, and wherein the fuel solution outlet and waste inlet includes self-sealing fluidic couplers configured to couple with complementary fluid couplers of the electronic device.

20. The fuel supply of claim 19, wherein the self-sealing fluidic couplers each include a septum configured to couple to a complementary needle on the device.

21. The fuel supply of claim 20, wherein the self-sealing fluidic couplers include a sealing ball positioned beneath the septum and biased with a spring toward the septum.

22. The fuel supply of claim 5, wherein the outer container includes a keying element configured to direct the fuel supply into a fuel supply receptacle in an electronic device in a correct orientation.

23. The fuel supply of claim 22, wherein the keying element includes a tab configured to fit in a complementary slot in the electronic device.

24. The fuel supply of claim 22, wherein the keying element is configured to indicate a type of fuel stored in the fuel supply.

25. The fuel supply of claim 22, wherein the keying element is configured to indicate a grade of fuel stored in the fuel supply.

26. The fuel supply of claim 22, wherein the keying element is configured to indicate a safety aspect of the fuel stored in the fuel supply.

27. A fuel supply for a fuel cell, the fuel cell having an anode and a cathode, the fuel supply comprising:
   a fuel storage area, the fuel storage area having a volume;
   a fuel solution outlet configured to pass a fuel solution from the fuel storage area;
   a waste storage area, wherein the waste storage area has a volume that includes a waste-absorbing material;
   a waste inlet configured to pass waste into the waste storage area; and
   a movable barrier separating the fuel storage area and the waste storage area, wherein the movable barrier is configured to move as the fuel solution is passed from the fuel storage area and a waste is passed into the waste storage area to simultaneously decrease the volume of the fuel storage area and increase the volume of the waste storage area.

28. The fuel supply of claim 27, wherein the waste-absorbing material is a super-absorbent material.

29. The fuel supply of claim 28, wherein the super-absorbent material is selected from the group consisting of cross-linked polyacrylic acid salts, polyvinyl alcohol, poly(2-hydroxyethyl methacrylate)/poly(ethylene oxide), isobutylene-maleic acid copolymer derivatives, poly(methacrylic acid) salts, poly(acrylamide) and polyvinylpyrrolidone.

30. A fuel supply for a fuel cell, the fuel cell having an anode and a cathode, the fuel supply comprising:
   a fuel storage area, the fuel storage area having a volume;
   a fuel solution outlet configured to pass a fuel solution from the fuel storage area;
   a waste storage area, the waste storage area having a volume;
   a waste inlet configured to pass waste into the waste storage area;
   a movable barrier separating the fuel storage area and the waste storage area, wherein the movable barrier is configured to move as the fuel solution is passed from the fuel storage area and a waste is passed into the waste storage area to simultaneously decrease the volume of the fuel storage area and increase the volume of the waste storage area; and
   a catalyst fluidly coupled to the fuel storage area for producing a fuel from the fuel solution.

31. A fuel supply for a fuel cell, comprising:
   an outer container;
   a fuel storage area defined within the outer container, the fuel storage area being configured to hold a fuel solution, and the fuel storage area having a fuel volume;
   a fuel solution outlet configured to pass a fuel solution from the outer container;
   a waste storage area defined within the outer container, the waste storage area being configured to hold a waste, and the waste storage area having a waste volume;
   a waste inlet configured to pass the waste into the outlet container;
   a movable barrier separating the fuel storage area and the waste storage area, wherein the movable barrier is configured to move as the fuel solution is passed from the outer container and the waste is passed into the outer container to simultaneously decrease the volume of the fuel storage area and increase the volume of the waste storage area; and
   a catalyst in fluid communication with the fuel storage area, wherein the fuel solution flows from the fuel storage area over the catalyst to produce a fuel for passage downstream to the fuel cell.

32. The fuel supply of claim 31, wherein the fuel storage area is defined by a first inner container, and wherein the waste storage area is defined by a second inner container.

33. The fuel supply of claim 32, further comprising a third inner container configured to contain a reactant that reacts with the fuel solution at the catalyst to produce the fuel.

34. The fuel supply of claim 33, wherein the reactant is water.

35. The fuel supply of claim 31, further comprising a pump to transfer fuel solution to the catalyst.

36. The fuel supply of claim 35, further comprising a pump control system configured to sense fuel cell performance and to control transfer of the fuel solution to the catalyst based on the fuel cell performance.

37. The fuel supply of claim 36, wherein the pump control system includes a pressure sensor configured to detect hydrogen pressure downstream of the catalyst.

38. The fuel supply of claim 36, wherein the pump control system includes a voltage meter to detect voltage across the fuel cell.

39. A fuel supply for a fuel cell, the fuel cell having an anode and a cathode, the fuel supply comprising:
   a fuel storage area;
   a fuel solution outlet configured to pass a fuel solution from the fuel storage area;
   a waste storage area;

a waste inlet configured to pass waste into the waste storage area; and a keying element configured to direct the fuel supply into a fuel supply receptacle in an electronic device in a correct orientation, the keying element having a configuration indicative of at least one of a type of fuel stored in the in the fuel supply, a grade of fuel stored in the fuel supply and a safety aspect of the fuel stored in the fuel supply.

40. The fuel supply of claim 39, wherein the keying element includes a tab configured to fit in a complementary slot in the electronic device.

41. The fuel supply of claim 39, wherein at least one of the fuel solution outlet and waste inlet includes a self-sealing coupler.

42. The fuel supply of claim 41, wherein the self-sealing coupler includes a ball-and-spring valve.

43. The fuel supply of claim 41, wherein the self-sealing coupler includes a septum.

44. The fuel supply of claim 39, wherein the keying feature is disposed in an asymmetric relation to the fuel solution outlet and the waste inlet.

45. The fuel supply of claim 39, wherein the keying feature includes first and second keying elements disposed in an asymmetric relation to each other.

46. The fuel supply of claim 39, the fuel supply being configured to be installed in a complementary receptacle and having a leading end relative to a direction in which the fuel supply is installed in the complementary receptacle, wherein the fuel solution outlet and waste inlet are disposed at the leading end of the fuel supply.

47. The fuel supply of claim 46, the fuel supply having a trailing end opposite the leading end, further comprising a handle disposed on the trailing end.

48. The fuel supply of claim 46, wherein the keying element is disposed adjacent the leading end of the fuel supply.

49. The fuel supply of claim 39, further comprising a movable barrier separating the fuel storage area and the waste storage area, wherein the barrier is configured to move as the fuel solution is passed from the fuel storage area and a waste is passed into the waste storage area.

* * * * *